United States Patent
Buchmann et al.

(10) Patent No.: US 7,756,870 B2
(45) Date of Patent: Jul. 13, 2010

(54) HANDLING OF STANDARIZED PROPERTIES AND THEIR USE IN DATA EXCHANGE

(75) Inventors: Daniel Buchmann, Pfinztal (DE); Uwe Pyke, Sinsheim-Hillsbach (DE); Michael Zoeller, Rauenberg (DE)

(73) Assignee: SAP AG, Walldorf (DE)

( * ) Notice: Subject to any disclaimer, the term of this patent is extended or adjusted under 35 U.S.C. 154(b) by 914 days.

(21) Appl. No.: 10/876,414

(22) Filed: Jun. 25, 2004

(65) Prior Publication Data

US 2005/0289504 A1    Dec. 29, 2005

(51) Int. Cl.
*G06F 7/00* (2006.01)
*G06F 17/30* (2006.01)
(52) U.S. Cl. .................................. 707/736; 707/756
(58) Field of Classification Search .............. 709/200, 709/223, 226; 707/220, 104, 10, 102; 717/102
See application file for complete search history.

(56) References Cited

U.S. PATENT DOCUMENTS

| | | | | |
|---|---|---|---|---|
| 5,946,696 | A * | 8/1999 | Young | 707/104.1 |
| 6,976,061 | B1 * | 12/2005 | Sharma | 709/220 |
| 2003/0182623 | A1 * | 9/2003 | Lynch et al. | 715/513 |
| 2004/0003013 | A1 * | 1/2004 | Coulthard et al. | 707/205 |
| 2004/0010402 | A1 * | 1/2004 | Reitman et al. | 703/22 |
| 2004/0230637 | A1 * | 11/2004 | Lecoueche et al. | 709/200 |
| 2005/0193029 | A1 * | 9/2005 | Rom et al. | 707/200 |

* cited by examiner

*Primary Examiner*—Charles Rones
*Assistant Examiner*—Fariborz Khoshnoodi
(74) *Attorney, Agent, or Firm*—Finnegan, Henderson, Farabow, Garrett & Dunner LLP

(57) ABSTRACT

The present invention relates to a data object model and methods and systems for mapping standardized data onto standardized properties of the object model and non-standardized data onto extensions. A reference referring to a data source may be mapped onto the extensions and the reference may be used to determine property data from the data source.

46 Claims, 4 Drawing Sheets

HANDLING OF STANDARDIZED PROPERTIES AND THEIR USE IN DATA EXCHANGE

FIELD OF THE INVENTION

The invention relates in general to computer-implemented methods and systems for displaying data objects within a user interface and, more particularly, to methods and systems for mapping proprietary data onto a standardized object model exchanging data objects between computers.

BACKGROUND

Data objects in general are described by properties. A property of a data object, such as a product, may be "color", and its value may be "red". Different standardization organizations provide standardized object models to define characteristics of certain data objects. For instance, the International Standardization Organization (ISO) publishes standardized object models comprising standardized properties. However, any other standardization of any standardization organization or institute is within the scope of the invention. The standardized properties may define elements of data objects, such as data type, and values of the properties.

When describing data objects within an enterprise resource planning (ERP) software using standardized object models, however, standardized properties lack information needed by business processes based on properties and their use in classification. Mapping properties and/or attributes of the respective business processes into the standardized data sets might not be possible as the business process has requirements, which may not be accounted for in the standardized object model. Insofar, standardized data models provide inflexibility with respect to the business process to be reproduced.

On the other hand, when using non-standardized properties or attributes to describe business processes, inter-company communication lacks interoperability. Proprietary properties defined for one business process might not fit onto a data model of a different business process. This lack of interoperability may result in manual transfer of information between different business processes, such as, for instance, different companies, or different software elements within one company.

The current data object models are inflexible with respect to standardized properties as well as inefficient with respect to data exchange between different organizations or business processes.

SUMMARY

To overcome these drawbacks, embodiments of the invention provide an object model for data objects, with the data objects comprising standardized properties, and extensions of the standardized properties with at least non-standardized attributes.

Using standardized properties as well as extensions, such as at least non-standardized attributes, enables the description of properties with additional data. Different processes may be described using the properties and extensions of the data object model. Additionally, the use of standardized properties may increase interoperability between different environments. Flexibility to map particularities of different business processes onto the object model may also become available.

Additional attributes may be added to the standard properties according to the needs of the used process, organization or software. The advantages of organization specific proprietary data models with information for individual needs may be combined with the advantages of standardized data models with their globally relevant information and their interoperability.

Another aspect of the invention is a computer-implemented method for mapping proprietary data onto a standardized object model by mapping standardized data onto standardized properties of the object model and non-standardized data onto extensions of the standardized properties.

A further aspect of the invention is a computer-implemented method for exchanging data objects, wherein valuation information of at least standard properties of the data objects are transferred from a first computer to a second computer, and wherein within the second computer the data object is identified at least from the standardized properties.

Yet, a further aspect of the invention is a computer-implemented method for displaying data objects within a user interface, wherein the user interface displays any extensions of the data objects.

Another aspect of the invention is a computer program product for mapping proprietary data onto a standardized object model, with a computer program, the program comprising instructions operable to cause a processor to map standardized data onto standardized properties of the object model and non-standardized data onto extensions to the standardized properties.

A further aspect of the invention is a computer program product for exchanging data objects, with a computer program, the program comprising instructions operable to cause a processor to transfer valuation information of at least standard properties of the data objects from a first computer to a second computer, and identify within the second computer the data object at least from the standardized properties.

Yet, a further aspect of the invention is a computer program product for displaying data objects within a user interface, with a computer program, the program comprising instructions operable to cause a processor to display any extensions of the data objects on a user interface.

Referring now to the drawings, in which like numerals represent like elements throughout the several figures, aspects of the present invention and the exemplary operating environment will be described.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention.

In the Drawings

DETAILED DESCRIPTION OF THE DRAWINGS

Reference will now be made in detail to the present embodiments of the invention, examples of which are illustrated in the accompanying drawings. Wherever possible, the same reference numbers will be used throughout the drawings to refer to the same or like parts.

In FIGS. 1-4, reference numbers 100/200, 110/210 denote similar elements, and the function of these elements can be different.

Figure 1:
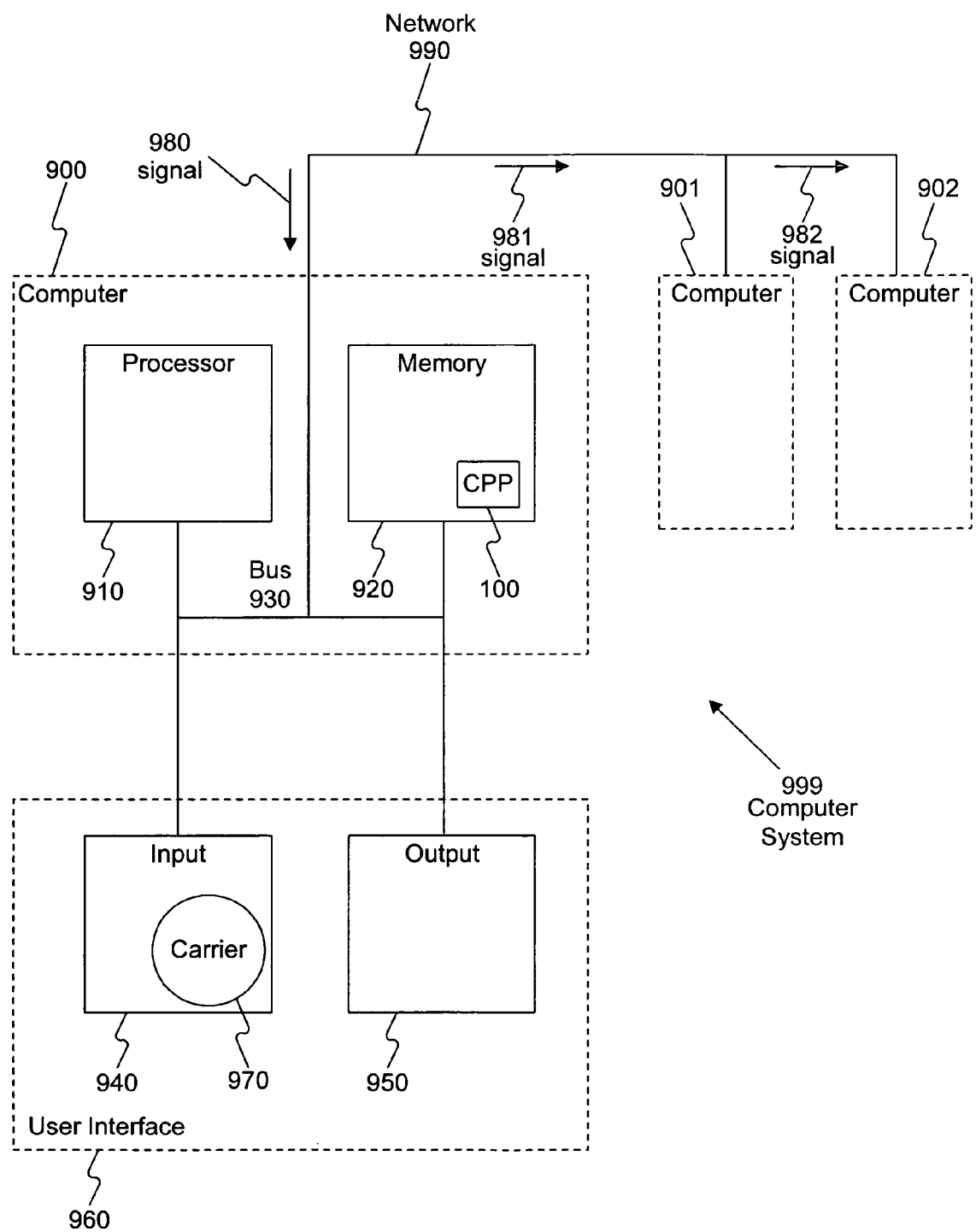
FIG. 1 illustrates a computer system consistent with the principles of the present invention.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, embodiments of the claimed invention may be implemented by computer program product 100 (CPP) and carrier 970.

In respect to computer 900, computer 901/902 is sometimes referred to as a "remote computer". Computer 901/902 may be, for example, a server, a peer device or other common network node, and typically has many or all of the elements described relative to computer 900.

Computer 900 may be, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 may be any elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 may be physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); or (c) semiconductor media, like DRAM, SRAM, EPROM, EEPROM, memory stick.

Optionally, memory 920 may be distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer-readable medium, such as a medium largely explained above (cf. memory 920). Generally, carrier 970 is an article of manufacture having a computer-readable medium with computer-readable program code to cause the computer to perform methods of the present invention.

Having described CPP 100 and carrier 970 in connection with computer 900 is convenient. Optionally, further carriers may embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN), a wide area network (WAN), a public switched telephone network (PSTN), a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an Internal or external modem, a video adapter, or a sound card.

Computer and program are closely related. As used hereinafter, phrases such as "the computer provides" and "the program provides" are used interchangeably to express actions by a computer that is controlled by a program.

The invention may be implemented within a computer system as illustrated in FIG. 1.

Figure 2:
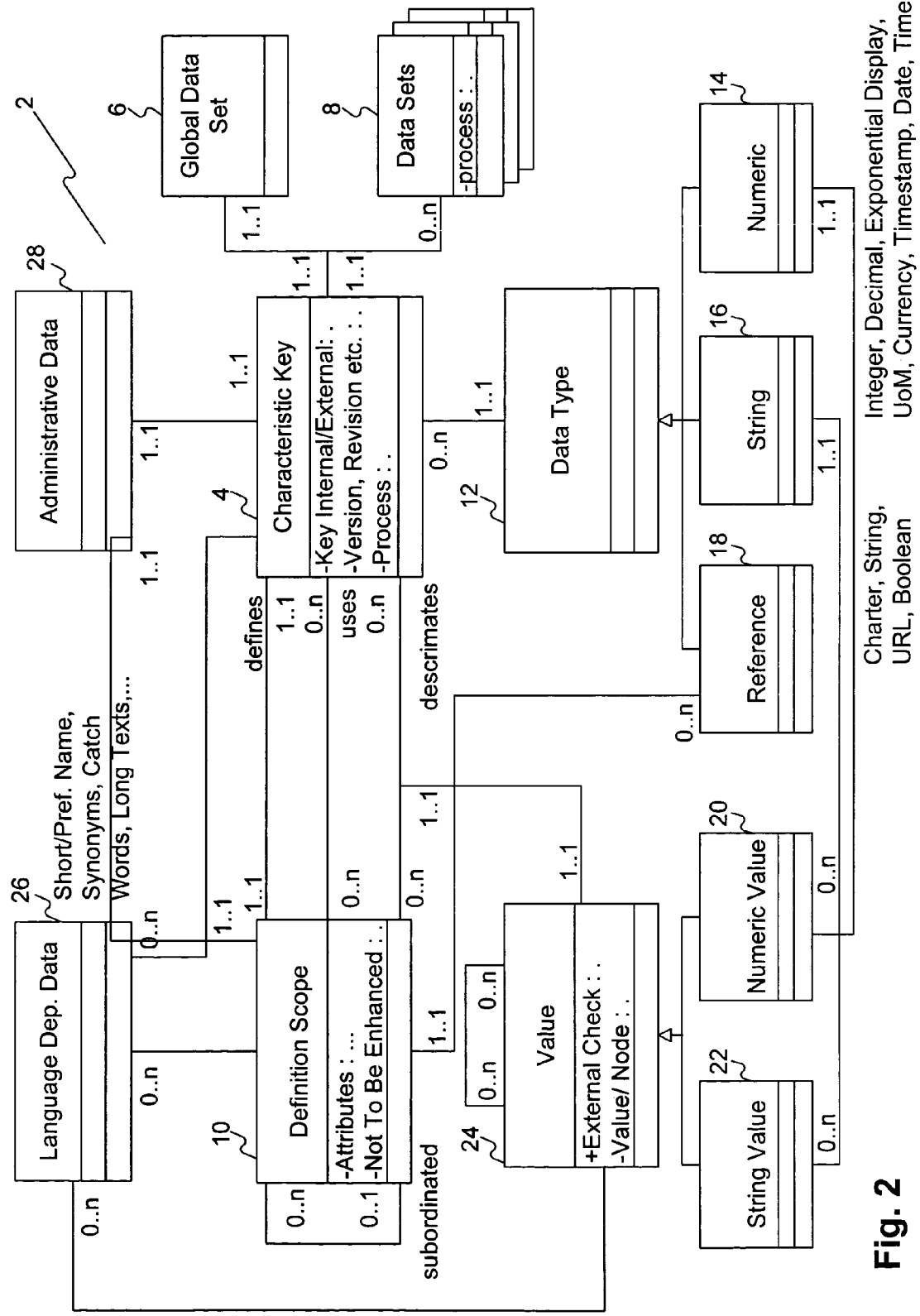
FIG. 2 illustrates a data object model consistent with the principles of the present invention.

FIG. 2 illustrates a data object model 2, consistent with the principles of the present invention, showing a data structure for standardized properties with non-standardized extensions. The object model 2 of a property comprises characteristic keys 4, global data sets 6, data sets 8, definition scope 10, data types 12, numeric data types 14, string data types 16, reference data types 18, numeric value types 20, string value types 22, value definition 24, language dependent data definition 26 and administrative data definition 28.

Property 2 may be distinguished by characteristic key 4. The characteristic key 4 may comprise internal and external identifiers, version numbers, data object owner information and others. By using the characteristic key 4, the property 2 may be identified. For each of the properties 2 described by a characteristic key 4, the global data set 6 is defined. Within the global data set 6, global data for the respective properties may be defined. Data sets 8 for the respective properties 2 may be defined. The data sets 8 may comprise information about the property 2. Data sets 8 may be standardized or non-standardized data sets. The information about standardized and non-standardized data sets as well as the name of the characteristic key may be in line with definitions obliged by standardization organizations. In this case, the characteristic keys 4 and the data sets 8 together with their values may be identified by their standardized names.

To account for proprietary data, and to allow flexibility in mapping proprietary data onto standardized properties, the data sets 8 may further comprise non-standardized values, which may be defined for a proprietary database, and may be used only within a well defined range, e.g. company wide, or bilaterally between two companies, which have agreed on the respective standardized and non-standardized data sets and properties.

To describe the property 2 within data sets 8 and 6, for each property 2, data type definitions 12 are defined. These data type definitions 12 define which values are allowed for the respective property. Among others, allowed data types may be numeric data type 14, comprising numeric information, string data type 16, comprising string values, and reference data type 18, comprising references to data.

By using reference data type 18, any data may be referenced to. This allows describing properties with any data. Constraints concerning the data type are obsolete.

String data type 16 and numeric data type 14 may have numeric values 20 and string values 22, which values 22, 24 are defined within value definition 24. For each property with the characteristic key 4, the definition scope 10 may define attributes, like editable, deleteable, fixed, readable, writeable and any other. Within definition scope 10, extensions may define further attributes, which are not in conformance with the standardized definition scope. For example, the attribute searchable may be included. This attribute may not be an attribute of a standardized property. However, some properties may be searchable. Therefore, this attribute may be used as extension.

Further, definition scope 10 may define, whether a property with a certain characteristic key 4 may or may not be enhanced with non-standardized data sets 8. Furthermore, the definition scope 10 may allow defining language dependent data 26. Language dependent data may also be not part of the standardized definition. The language dependent data may be used as extensions to the property 2. This extension may not be in conformance with the standard, however, it may be needed in certain business processes. Therefore, the object models according to this embodiment may provide the use of language dependent data.

Language dependent data definition 26 defines language dependent information, such as which language to be used for the respective data object, or which in language the values may be stored.

Finally, administrative data definition 28 may define global settings concerning administrative information of the data objects. Extensions, which may not be in conformance with the standardized object model, may override these global administrative data sets.

As data types of properties and extensions may be defined, embodiments consistent with the principles of the present invention provide non-standardized data types for properties and extensions. Insofar, values of properties with non-standardized data types may be included within the data objects using the extensions, as these may allow using non-standardized data types. Data types may be, for example, string value, numeric values, references, or any other possible data types.

To allow describing more complex business processes, the extensions may define additional properties of the data objects according to embodiments. These additional properties may be properties which do not fit into the standardized properties.

To account for different languages, embodiments consistent with the principles of the present invention provide extensions with language dependent data.

Global setting may be overridden by the extensions. Insofar, the extension may obey to local settings. The extensions do not have to fit into the global settings.

According to embodiments consistent with the principles of the present invention, at least the extensions may be assigned to an owner. The owner may be responsible for data consistency of the extensions. The extensions may be used by different processes or applications, but may only be changed by one owner. As the owner is responsible for data consistency, only the owning process may change, for example, attributes, data types, or any other data of the extensions.

While standardized data sets must not be changed by any user, the extensions may be modified. For example, it may depend on the owner of the extensions, whether the respective extensions may be changed or not. The owner of an extension may be, for example, an organization, a process or an application. The owner may define, for example, an attribute that describes the modifiability of the respective extension.

To allow use of distributed data within the data model, embodiments consistent with the principles of the present invention provide that the extensions comprise a reference. This reference may refer to a data source. The reference may, for instance refer to an existing property. Existing classification may insofar be used. During valuation, the reference may be used to determine the data from the data source using the reference. The reference may be an extension to the standard property. By using references, any type of data may be used within the properties. Another effect of the reference concept may be that standardized properties may be used as an additional layer. A company might not need to change the object model at all, but may just add a reference to the respective property. The reference may be used to refer to the respective value. When accessing the value of the data object, the reference may be used to read the respective data.

The integration of data, no matter of which origin, into standard properties by adding such a reference, may also have an impact on communication of the data objects. Communication may take place only based on property descriptions. The message type and object model of the communication partner may not be relevant.

To allow defining, and specifying properties, data keys may be defined. The data keys may be assigned to properties during standardization or during creating non-standardized properties.

A part of a data key may be, for instance, a version number. This version number may allow distinguishing, which of two versions of a property is a newer one, which may, for instance, replace the elder version. Functions may be implemented, allowing to automatically update elder versions, if the standardization organization issues a new version of a property.

In case data for a certain property version is received for any purpose, and this property version is not available in the respective system, it may be checked to determine whether any other version of the same property is available to be used instead.

To define which values are valid for valuation of a property, data types may be defined for the properties or extensions, the format settings defining data structures and formats of the properties or extensions. The format settings may define the list of valid values for a property. Changes to the format settings may, for instance, be locked as soon as the property is first used in a data object. The format setting may in this case not be changed anymore. All future values of the same property might be required to be of the locked key type.

To provide data consistency, embodiments consistent with the principles of the present invention may provide definition of the data types during valuation of the data object model and locking changes to the data types after a first valuation of a data set. Once a data object has been created, the data type of this data set may not be changed anymore. This may guarantee that the data type of a property remains constant after a first valuation of a data object.

The combined use of standardized properties together with non-standardized extensions in the same process enhances the way of using the classification concept. To allow using standardized properties and non-standardized extensions, embodiments consistent with the principles of the present invention provide mapping values of data of a proprietary database onto the data objects, wherein standard data is mapped onto standardized properties and non-standard data is mapped onto the extensions during valuation. The standard data may be any data, which fits onto the standard properties. The non-standard data may be any additional data, which is not covered by the standard properties. This non-standard data may be mapped onto the extensions.

Figure 3:
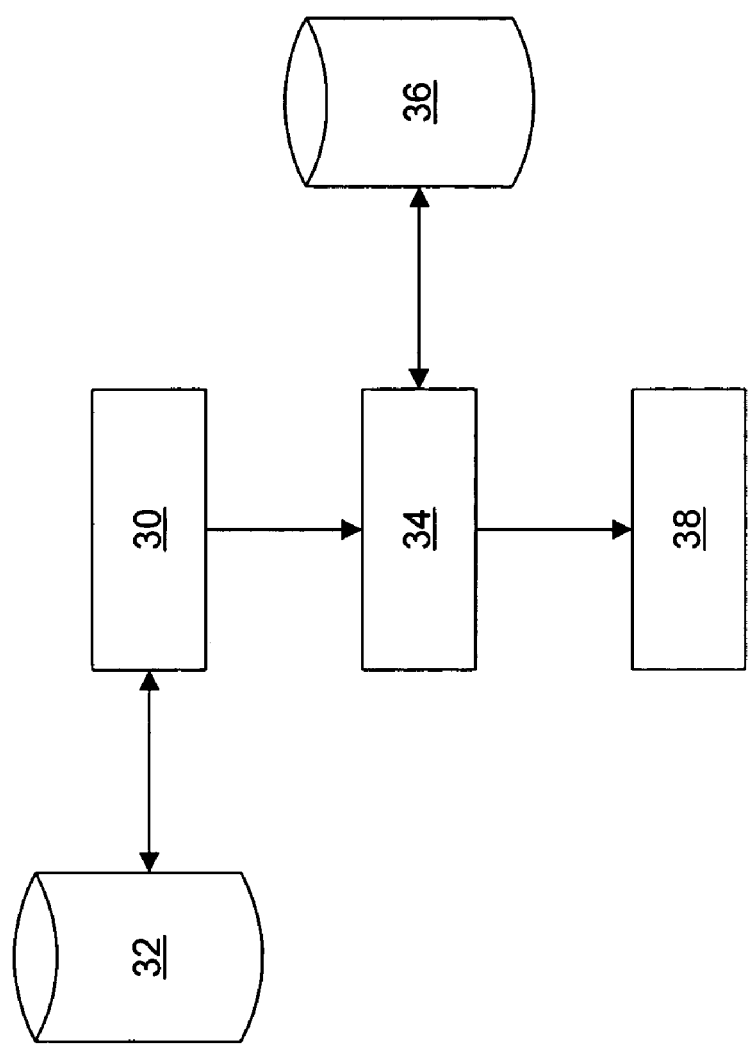
FIG. 3 illustrates a method for defining data objects consistent with the principles of the present invention.

FIG. 3 illustrates an exemplary method for defining and evaluating properties with a standardized data object model consistent with the principles of the present invention. A standardized data object model may be loaded from a standard server 32 (30). Thereby, a standard characteristic key for properties together with data types and any other standardized information may be loaded from the standard server 32 onto a local server.

Proprietary data is read from a database (34). The proprietary values may be analyzed. It is determined, which properties may be mapped onto the respective standardized properties of the standardized object model. Additionally, data, which does not fit into the standardized properties, may be mapped onto extensions within the object model. The extensions may comprise properties as well as attributes or any other data within the standardized attributes. The proprietary data from the database 36 may be mapped into the standardized properties where appropriate. Data, which is not accounted for within the standardized object model, may be mapped onto the non-standardized extensions.

After mapping the data of database 36 into the data object model, data may be transferred easily (38). As the data, which fits onto the standard properties, is mapped onto these standard properties, the data may be transferred to any other database knowing the standard. Within this database, the characteristic key and the name of the property may be identified and the respective values may be used accordingly. This is possible, as the standard defines characteristic keys, properties and their use. The standard may also define the scope and data types of the properties.

Data exchange may be simplified by the inventive method. The receiving systems may identify properties from their data keys, as these keys correspond to the standard properties within the object model. Receiving values for standard properties and identifying these may be possible.

Data exchange was based on the exchange format and not on the content to be exchanged. Using standard properties in data exchange may enable the receiving computer to interpret the received data. There might be no need to define a fixed exchange format containing all different object types.

Two companies agreeing on an informal communication standard between each other insofar may use this kind of data exchange to send and receive both globally comprehensible standard properties belonging to their bilateral agreement in the message. A separation of property valuation information in data exchange for technical reasons may become obsolete.

Figure 4:
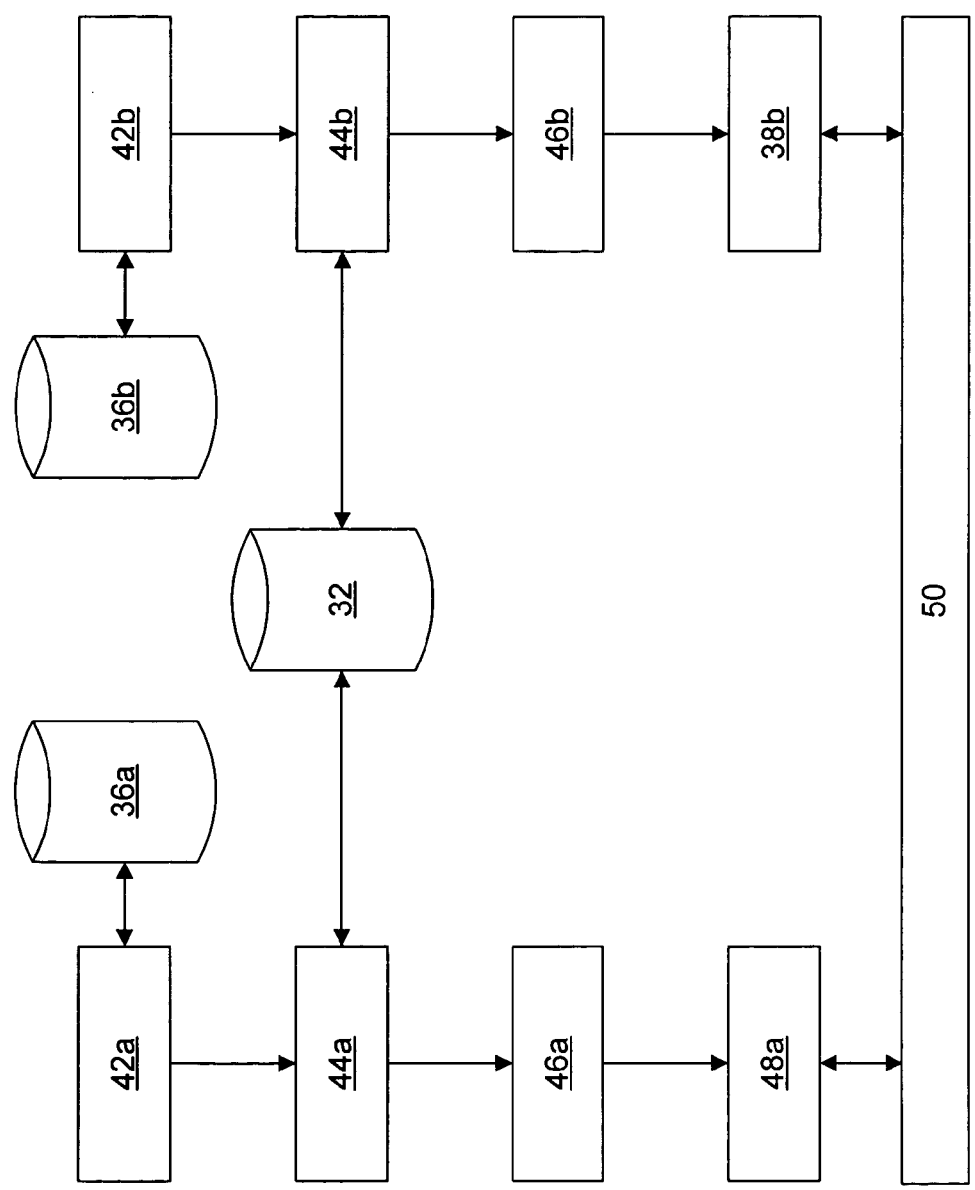
FIG. 4 illustrates a method for transferring data objects consistent with the principles of the present invention.

The exchange of data may also be illustrated in FIG. 4. Proprietary data from different databases 36a, and 36b is loaded within different computer systems, or programs (42a, b). Standardized data object model definitions are loaded from a standard server 32 (44a, b). The local data is mapped onto the standardized properties (46b, a) where appropriate. Any data, which is not in conformance with the standardized properties, may be mapped onto non-standardized extensions.

The data, which has been mapped onto the standardized properties is exchanged via network 50 with the respective other environment (48a, b). By using the standardized properties, the receiving environment may identify the data and may use this information accordingly. The exchanged format does not have to account for the data comprised, as the data is already described by the standardized properties and therefore known within each environment from loading the standard from standard server 32. This may allow exchanging data of different owners, companies, databases without knowing each other's proprietary object model.

By using the inventive data object model, proprietary data may be mapped onto standardized data sets and non-standardized extensions. Flexibility may be provided by using non-standardized extension. Exchanging data between different environments without knowing each other's object model may be possible by using the standardized properties.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method of creating a data object comprising:
   receiving data from a database associated with a business process, wherein the data includes standard data and non-standard data;
   creating, utilizing the processor, the data object model associated with the business process, wherein the data object model is a data structure describing a data object, and wherein the data object model includes:
      a characteristic key for identifying the data object model,
      a global data set associated with the characteristic key that defines global data for the property,
      a standardized data set that includes standardized properties,
      a non-standardized data set that includes extension of the standardized properties, and
      a definition scope that determines whether the property associated with the characteristic key includes the non-standardized data set; and
   mapping, utilizing the processor, the received data onto the data object model, wherein the standard data is mapped onto the standardized properties and the non-standard data is mapped onto the extensions of the standardized properties.

2. The method of claim 1, wherein the standard data includes any data that fits onto standardized properties and the non-standard data includes any additional data that does not fit onto standardized properties.

3. The method of claim 1, wherein the characteristic key is based on a standard.

4. The method of claim 1, wherein the standardized data set or the non-standardized data set includes a data value formatted as a numeric data type, a string data type, or a reference data type.

5. The method of claim 4, wherein the numeric data type has a numeric value type, the string data type has a string value type, and the reference data type comprises a reference to a data source or to an existing property associated with the data object model.

6. The method of claim 1, wherein the extensions of the standardized properties comprise non-standardized attributes associated with the business process.

7. The method of claim 1, wherein the extensions of the standardized properties comprise language dependent data.

8. The method of claim 1, wherein the extensions of the standardized properties override global settings.

9. The method of claim 1, wherein the extensions of the standardized properties comprise a reference to a data source used to determine property data from the data source.

10. The method of claim 1, wherein the extensions of the standardized properties may be modified by an owner of the extensions.

11. The method of claim 10, wherein the owner of the extensions of the standardized properties comprises: an organization, a process, or an application.

12. The method of claim 1, wherein mapping the received data onto the data object model occurs during valuation of the data object.

13. The method of claim 12, further comprising:
    mapping language dependent data onto extensions of the standardized properties.

14. The method of claim 12, further comprising:
    mapping a reference to a data source onto the extensions of standardized properties; and
    determining property data of the data source, based on the reference to the data source.

15. A computer implemented method of exchanging data objects, comprising:
    receiving data from a database associated with a business process, wherein the data includes standard data and non-standard data;
    creating, utilizing the processor, the data object model associated with the business process, wherein the data object model is a data structure describing a data object, and wherein the data object model includes:
       a characteristic key for identifying the data object model,
       a global data set associated with the characteristic key that defines global data for the property,
       a standardized data set that includes standardized properties,
       a non-standardized data set that includes extension of the standardized properties, and
       a definition scope that determines whether the property associated with the characteristic key includes the non-standardized data set; and
    mapping, utilizing the processor, the received data onto the data object model, wherein the standard data is mapped onto the standardized properties and the non-standard data is mapped onto the extensions of the standardized properties; and
    transferring, utilizing the processor, mapped data to a second business process using the data object.

16. The method of claim 15, wherein mapped data comprises valuation information of standardized properties or valuation information of the extensions of the standardized properties.

17. The method of claim 15, wherein the extensions of the standardized properties comprise language dependent data.

18. The method of claim 15, wherein the extensions of the standardized properties comprise a reference to a data source used to determine property data from the data source.

19. The method of claim 18, wherein the second business process identifies the data object based on, in part, the standardized properties of the data object model.

20. A computer implemented method of displaying data objects, comprising:
    receiving data from a database associated with a business process, wherein the data includes standard data and non-standard data;
    creating, utilizing the processor, the data object model associated with the business process, wherein the data object model is a data structure describing a data object, and wherein the data object model includes:
       a characteristic key for identifying the data object model,
       a global data set associated with the characteristic key that defines global data for the property,
       a standardized data set that includes standardized properties,
       a non-standardized data set that includes extension of the standardized properties, and
       a definition scope that determines whether the property associated with the characteristic key includes the non-standardized data set; and
    mapping, utilizing the processor, the received data onto the data object model, wherein the standard data is mapped onto the standardized properties and the non-standard data is mapped onto the extensions of the standardized properties; and displaying, the non-standard data mapped onto the extensions of the standardized properties of the data object model.

21. The method of claim 20, wherein the extensions of standardized properties comprise non-standardized data types.

22. The method of claim 20, wherein the extensions of the standardized properties comprise language dependent data.

23. The method of claim 20, wherein the extensions of the standardized properties comprise a reference to a data source used to determine property data from the data source.

24. A computer program product, stored on a computer-readable storage medium, for creating a data object model of a property in a computer system, the program comprising instructions causing a processor to perform the steps comprising:

receiving data from a database associated with a business process, wherein the data includes standard data and non-standard data;

creating, utilizing the processor, the data object model associated with the business process, wherein the data object model is a data structure describing a data object, and wherein the data object model includes:

a characteristic key for identifying the data object model, a global data set associated with the characteristic key that defines global data for the property, a standardized data set that includes standardized properties, a non-standardized data set that includes extension of the standardized properties, and a definition scope that determines whether the property associated with the characteristic key includes the non-standardized data set; and mapping, utilizing the processor, the received data onto the data object model, wherein the standard data is mapped onto the standardized properties and the non-standard data is mapped onto the extensions of the standardized properties.

25. The computer program product of claim 24, wherein the standard data includes any data that fits onto standardized properties and the non-standard data includes any additional data that does not fit onto standardized properties.

26. The computer program product of claim 24, wherein the characteristic key is based on a standard.

27. The computer program product of claim 24, wherein the standardized data set or the non-standardized data set includes a data value formatted as a numeric data type, a string data type, or a reference data type.

28. The computer program product of claim 27, wherein the numeric data type has a numeric value type, the string data type has a string value type, and the reference data type comprises a reference to a data source or to an existing property associated with the data object model.

29. The computer program product of claim 24, wherein the extensions of the standardized properties comprise non-standardized attributes associated with the business process.

30. The computer program product of claim 24, wherein the extensions of the standardized properties comprise language dependent data.

31. The computer program product of claim 24, wherein the extensions of the standardized properties override global settings.

32. The computer program product of claim 24, wherein the extensions of the standardized properties comprise a reference to a data source used to determine property data from the data source.

33. The computer program product of claim 24, wherein the extensions of the standardized properties may be modified by an owner of the extensions.

34. The computer program product of claim 33, wherein the owner of the extensions of the standardized properties comprises: an organization, a process, or an application.

35. The computer program product of claim 24, wherein mapping the received data onto the data object model occurs during valuation of the data object.

36. The computer program product of claim 35, further comprising:

mapping language dependent data onto extensions of the standardized properties.

37. The computer program product of claim 35, further comprising:

mapping a reference to a data source onto the extensions of standardized properties; and determining property data of the data source, based on the reference to the data source.

38. A computer program product, stored on a computer-readable storage medium, for exchanging data objects, the program comprising instructions causing a processor to perform the steps comprising:

receiving data from a database associated with a business process, wherein the data includes standard data and non-standard data;

creating, utilizing the processor, the data object model associated with the business process, wherein the data object model is a data structure describing a data object, and wherein the data object model includes:

a characteristic key for identifying the data object model, a global data set associated with the characteristic key that defines global data for the property, a standardized data set that includes standardized properties, a non-standardized data set that includes extension of the standardized properties, and a definition scope that determines whether the property associated with the characteristic key includes the non-standardized data set; and mapping, utilizing the processor, the received data onto the data object model, wherein the standard data is mapped onto the standardized properties and the non-standard data is mapped onto the extensions of the standardized properties; and transferring, utilizing the processor, mapped data to a second business process using the data object.

39. The computer program product of claim 38, wherein mapped data comprises valuation information of standardized properties or valuation information of the extensions of the standardized properties.

40. The computer program product of claim 38, wherein the extensions of the standardized properties comprise language dependent data.

41. The computer program product of claim 38, wherein the extensions of the standardized properties comprise a reference to a data source used to determine property data from the data source.

42. The computer program product of claim 41, wherein the second business process identifies the data object based on, in part, the standardized properties of the data object model.

43. A computer program product, stored on a computer-readable storage medium, for displaying data objects, the program comprising instructions causing a processor to perform the steps comprising:

receiving data from a database associated with a business process, wherein the data includes standard data and non-standard data;

creating, utilizing the processor, the data object model associated with the business process, wherein the data object model is a data structure describing a data object, and wherein the data object model includes:

a characteristic key for identifying the data object model, a global data set associated with the characteristic key that defines global data for the property, a standardized data set that includes standardized properties, a non-standardized data set that includes extension of the standardized properties, and a definition scope that determines whether the property associated with the characteristic key includes the non-standardized data set; and mapping, utilizing the processor, the received data onto the data object model, wherein the standard data is mapped onto the standardized properties and the non-standard data is mapped onto the extensions of the standardized properties; and displaying, the non-standard data mapped onto the extensions of the standardized properties of the data object model.

44. The computer program product of claim 43, wherein the extensions of the standardized properties comprise non-standardized data types.

45. The computer program product of claim 43, wherein the extensions of the standardized properties comprise language dependent data.

46. The computer program product of claim 43, wherein the extensions of the standardized properties comprise a reference to a data source used to determine property data from the data source.

* * * * *